United States Patent [19]
DeLong

[11] Patent Number: 5,322,554
[45] Date of Patent: Jun. 21, 1994

[54] ASPHALT RELEASE AGENT AND SYSTEM

[75] Inventor: William M. DeLong, Aurora, Colo.

[73] Assignee: The ChemMark Corporation, Inc., Aurora, Colo.

[21] Appl. No.: 894,151

[22] Filed: Jun. 3, 1992

[51] Int. Cl.⁵ .................................................. C09D 5/08
[52] U.S. Cl. ...................................... 106/14.11; 106/2; 106/14.05; 106/14.12; 106/38.22; 106/14.44
[58] Field of Search ............... 106/14.12, 14.05, 14.44, 106/14.11, 38.22, 2; 252/387

[56] References Cited

U.S. PATENT DOCUMENTS

| | | | |
|---|---|---|---|
| 3,458,327 | 7/1969 | Fraser | 106/14.21 |
| 3,474,166 | 10/1969 | Babcock | 106/38.22 |
| 3,996,181 | 12/1976 | Hayashi et al. | 524/25 |
| 4,084,981 | 4/1978 | Higushi | 106/671 |
| 4,250,300 | 2/1981 | Saegusa | 528/191 |
| 4,350,723 | 9/1982 | Sugimura et al. | 428/42 |
| 4,362,639 | 12/1982 | Eoga | 252/387 |
| 4,534,794 | 8/1985 | Walter et al. | 252/387 |
| 4,728,446 | 3/1988 | Doty et al. | 252/387 |
| 4,741,844 | 5/1988 | Posey | 252/8.533 |
| 4,780,150 | 10/1988 | Anderson et al. | 252/148 |
| 4,803,007 | 2/1989 | Garber | 252/387 |
| 4,849,171 | 7/1989 | Murray | 252/387 |
| 4,937,027 | 6/1990 | Oshio et al. | 264/256 |
| 4,937,033 | 6/1990 | Oshio et al. | 264/133 |
| 4,963,290 | 10/1990 | Bressan et al. | 252/387 |

*Primary Examiner*—Anthony Green
*Attorney, Agent, or Firm*—Greenlee and Winner

[57] ABSTRACT

An asphalt release agent and a method of applying the same, including a water-based solution of magnesium chloride and/or calcium chloride together with a phosphate ester corrosion inhibitor, an anionic isopropyl alcohol surfactant and a dye. The release agent is applied using a spray gun in combination with an air compressor to add air to foam the release agent.

9 Claims, 1 Drawing Sheet

ASPHALT RELEASE AGENT AND SYSTEM

FIELD OF THE INVENTION

The present invention relates to the field of asphalt release agents for use in preventing asphaltic compounds such as road asphalt from sticking to equipment used to transport and work the asphalt such as truck beds and tools. In particular, the asphalt release agent of the present invention includes a corrosion inhibitor to also prevent the corrosion of metallic surfaces and a surfactant that increases the spread of the agent as it is applied.

BACKGROUND OF THE INVENTION

Most roads are paved with asphalt, which is produced at an asphalt plant and transported to the construction site in large truck beds such as dump trucks. A difficulty with the transportation operation is that the asphalt tends to stick to the metal surface of the truck bed. The sticking of the asphalt to the bed prevents the asphalt from smoothly sliding out of the bed as the dump truck attempts to discharge its asphalt load. In order to overcome this, workers must coax the asphalt out of the bed using tools. This sticking of the asphalt also affects the tools and other equipment such as rollers.

Asphalt release agents are a well known approach to preventing asphalt from sticking to metallic surfaces. A common release agent used in the past was a hydrocarbon fuel such as ordinary diesel fuel. Such fuels are extremely effective in cutting asphalt in order to prevent it from sticking. However, the reason for their effectiveness is that they combine with and dilute the asphalt. This impairs the structural integrity of the laid asphalt in the roadway. Also, the indiscriminate use of fuel as a release agent contaminates the ground beneath the truck where the agent is applied due to the runoff of excess from the truck onto the ground. For these reasons, the Department of Transportation and many state highway departments have severely restricted the use of fuel as a release agent.

There are other asphalt release agents that are not fuel-based. However, most of these other release agents suffer from some combination of being limited in their effectiveness, being environmentally dangerous, or being expensive. Most of these other release agents also suffer from their complexity in either the delivery, preparation or application steps of utilization. In addition, it is desirable that a release agent contain a corrosion inhibitor to prevent or at least inhibit corrosion of the surfaces to which it is applied, and many of the alternate release agents have no such inhibitor.

It is apparent that there is a need for an asphalt release agent which is effective in preventing the sticking of asphalt to truck beds and other surfaces, is environmentally safe, inhibits corrosion of the surfaces to which it is applied, and is inexpensive.

SUMMARY OF THE INVENTION

The present invention is an asphalt release agent comprising water, an inorganic active ingredient, a corrosion inhibitor and a surfactant or foaming agent. In preferred modes of the invention, the active ingredient is magnesium chloride or calcium chloride or combinations of magnesium chloride and calcium chloride. Preferred corrosion inhibitors of the present invention are passive corrosion inhibitors such as sodium phosphate esters. A preferred surfactant or foaming agent is an anionic isopropyl alcohol.

The release agent of the present invention is stored in bulk and can be applied to a truck bed or other surface by a spray gun. The release agent is mixed with pressurized air which allows the surfactant to spread the release agent. The use of a foam product makes the release agent easier to apply and more economical.

DETAILED DESCRIPTION OF THE INVENTION

Figure 1:
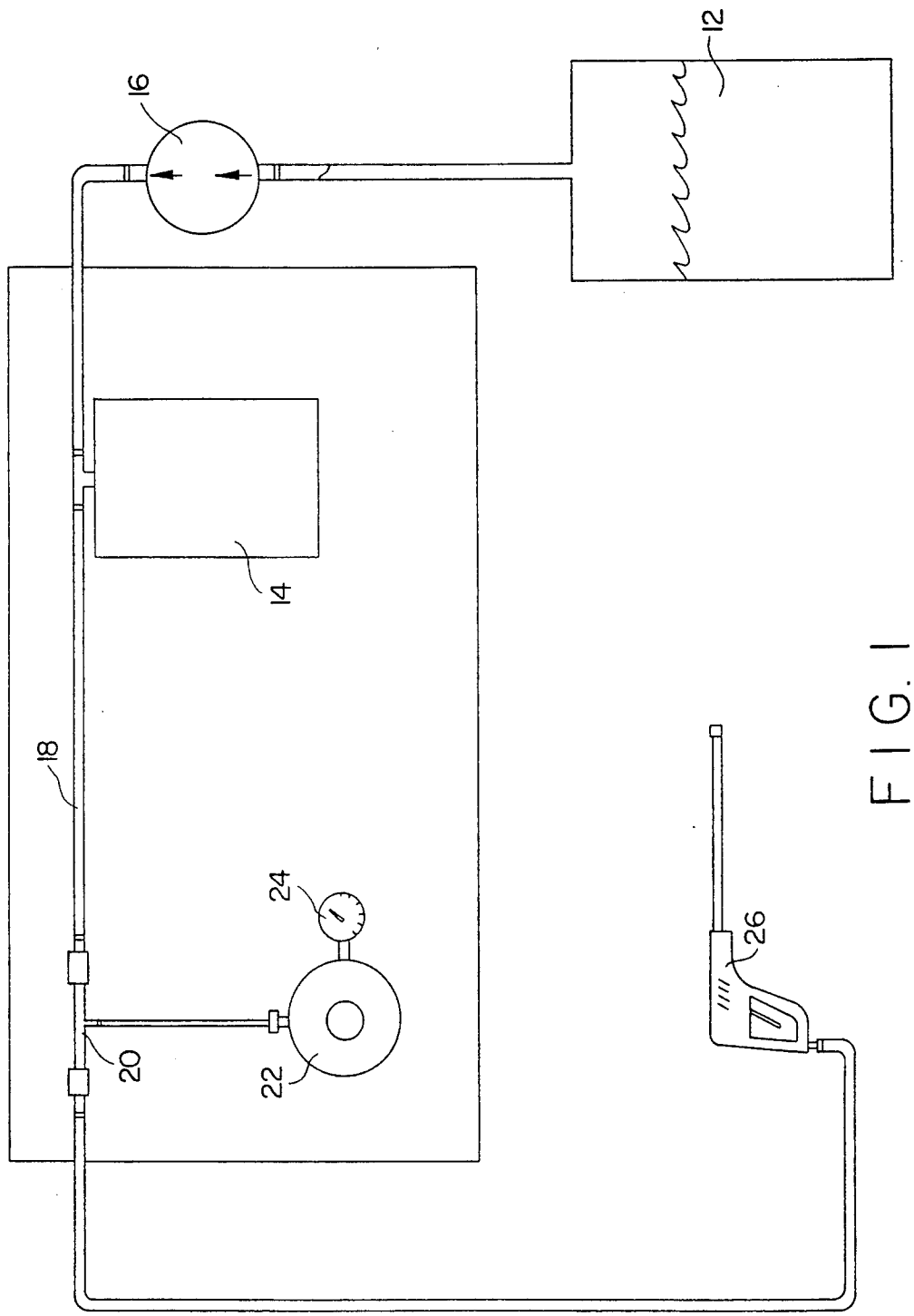
FIG. 1 shows a schematic diagram of a system for applying the release agent of the present invention.

This invention includes a novel asphalt release agent and a method for applying such a release agent to the bed of a truck or other metal surfaces that come in contact with asphalt. Although the release agent of this invention is specifically designed for use with asphalt, it also has utility as a release agent for other similar hydrocarbon or oil-based products.

Ideally, a release agent must be effective in preventing asphalt from sticking to the bed of a truck or other metal elements with which the asphalt comes in contact. The mechanism by which the release agent acts to achieve this goal is not important so long as the use of the release agent is environmentally sound, economical, and easily utilizable. Traditionally the most commonly used release agents worked by "softening" or reducing the density of the asphalt which it contacted, thereby reducing sticking at the asphalt metal interface. This is the mechanism of action when diesel fuel is used as a release agent. As mentioned above, release agents that soften the asphalt are no longer considered desirable, and in most locations are actually prohibited by law. A release agent may also be a water-based surfactant that acts exclusively by making a "slippery" surface at the interface, without softening the asphalt.

According to the present invention, a water-based asphalt release agent is taught having as an active ingredient an inorganic salt. Such a release agent does not "soften" the asphalt, and it also does not act merely as a surfactant. The reason or reasons that the inorganic salt-based release agent is effective are not clearly understood. Although not limited by theory, it is postulated that the inorganic salts act to accelerate the hardening of the asphalt at the point that it contacts the release agent, thereby reducing the "stickiness" of the asphalt. The ability to accelerate the hardening process may be a function of the hygroscopic nature of the salts, or part of an ion exchange process between the asphalt and the release agent. It is also possible that the inorganic salts form a crystal layer or film on the surface to which it is applied upon evaporation, and it is the film layer which prevents the asphalt from adhering to the metal surface.

The active ingredient of the asphalt release agent of the present invention may be any inorganic salt. The preferred inorganic salts are the halide salts of bivalent metals, e.g., $MgCl_2$, $MgBr_2$, $CaCl_2$, $CaBr_2$, and the most preferred active ingredients are $MgCl_2$ and $CaCl_2$. The present invention also contemplates the use of a mixture of two or more inorganic salts as the active ingredient. In the most preferred embodiment of the invention, the active ingredients comprise a mixture of $MgCl_2$ and $CaCl_2$. An ideal and economical source of $MgCl_2$ and CaCl₂ is brine, which can be evaporated to yield a MgCl₂·CaCl₂ mixture of suitable purity for use in this invention.

According to this invention, the water-based asphalt release agent contains from 3-50% by weight of the active ingredient inorganic salt, preferably between 5 and 35%.

For standard asphalt compositions, a most preferred embodiment of the asphalt release agent of this invention contains between 10-14% active ingredient. The exact amount of active ingredient is not critical, but it is desirable to use the minimum amount of active ingredient that is necessary to yield the desired release effects. The degree of release effect is directly proportional to the amount of active ingredient utilized. For example, where the composition of the asphalt is such that there is still some sticking when using a standard active ingredient solution, the concentration of the active ingredient may be increased until adequate release action is shown. Such fine tuning to determine the optimal active ingredient concentration is very straightforward, and can be performed easily by one skilled in the art without undue experimentation. Of course, for most applications of the product of this invention, the active ingredient concentration will be within the most preferred parameters and no fine-tuning is necessary.

The use of inorganic salts as the active ingredient in the asphalt release agent allows for the preparation of tailored release agents based on the environmental conditions. For example, a solution containing greater concentrations of active ingredient reduces the freezing point of the release agent. This allows the releasing agent to be used even at extremely low ambient temperatures.

The asphalt release agent of the present invention also comprises a corrosion inhibitor. The corrosion inhibitor prevents the highly ionic release agent from corroding the metal surfaces to which it is applied. The preferred corrosion inhibitors are passive inhibitors, for example, the phosphate esters that are commonly known in the art. Passive corrosion inhibitors are well known to those familiar to the field. Passive corrosion inhibitors are those that act by binding to the metal surface, and are distinguished from coating or film corrosion inhibitors and scavenging corrosion inhibitors. In a preferred embodiment, the corrosion inhibitor is a pH-neutralized sodium phosphate ester.

The asphalt release agent of the present invention contains between 0.01 and 2% by weight corrosion inhibitor. In the preferred embodiment, the release agent contains about 0.25% corrosion inhibitor.

The asphalt release agent of the present invention also comprises a surfactant or foaming agent. The surfactant functions predominantly—in conjunction with the mode of application—to allow the release agent to be applied as a foam. Using a foam generally allows for the use of less release agent than when a non-foamed liquid is used. The foam also allows the person applying the release agent to better visualize where the material has been applied. And finally, in a foam the water content of the applied material is more rapidly reduced than in the non-foam administration of a water-based release agent. This rapid concentrating of the active ingredient enhances the effectiveness of the release agent. Using a form also makes it easier for the release agent to adhere to vertical surfaces such as the sides of a truck bed.

The surfactant utilized may be easily selected by one of ordinary skill in the art. Certain classes of surfactants have been found to be particularly effective for use with high inorganic salt content solutions. A preferred class of surfactants for this invention are anionic isopropyl alcohols.

In certain embodiments of the invention, a final ingredient of the asphalt release agent is a dye material. The dye aids the person applying the release agent in visualizing where the release agent has been applied. In a preferred embodiment, the asphalt release agent of this invention has less than 0.1% of a commercial dye.

The release agent of the preferred embodiment is a solution of approximately 90% water. The other 10% of the solution is approximately 85% magnesium chloride and 13% calcium chloride, along with less than 1% dye, about 1% phosphate ester as a corrosion inhibitor and about 1% surfactant. The phosphate ester is a sodium phosphate ester that is pH neutralized and is available from ChemMark Corporation in Denver, Colo. The surfactant is an anionic isopropyl alcohol available under the name Peak Plus from ChemMark Corporation of Denver, Colo. The dye is an ordinary liquid dye. Of course, the precise proportions of the various chemicals is not critical.

A preferred embodiment of the release agent has roughly the following characteristics:

Color: Reddish-Pink
Odor: Slight
Specific Gravity: 1.08-1.20
Lbs per Gallon: 9.01-10.50
Boiling Point °F: 175-200
Freezing Point °F: +10--15

The release agent may be manufactured and stored as a concentrate of magnesium chloride or calcium chloride, and then the water to dilute to the appropriate concentration and dye, surfactant and corrosion inhibitor added before shipping or at a local terminal. It is preferred that the dilution is not done on-site in order to maintain product consistency and to assure ease of use.

According to the method of the present invention, the novel asphalt release agent described herein is applied as a foam. The foam is produced on site by the use of widely available equipment which consists of means for injecting the liquid release agent solution with compressed air just prior to being forced through a nozzle. The presence of the surfactant in the release agent allows for the formation of the foam. Although the exact nature of the foam is not critical, the characteristics of the foam can easily be optimized by those skilled in the art by adjusting the concentration of the surfactant and/or the air pressure used in creating the foam.

FIG. 1 shows a system for applying the release agent. A storage tank 12 stores the release agent for use on an as-needed basis. A pump 14 draws the release agent out of the storage tank and through a filter 16 to filter out impurities. The release agent passes through a line 18 into an eductor 20. The eductor 20 draws pressurized air from an air compressor 22, the pressure of which can be monitored by an associated air pressure gage 24. After the pressurized air is injected into the release agent, it can be sprayed through a spray gun 26 onto a truck bed or other desired surface.

I claim:

1. An asphalt release agent comprising 3 to 50 percent inorganic salt, 0.01 to 2 percent surfactant, 0.01 to 2 percent corrosion inhibitor, and the balance water.

2. The release agent of claim 1, wherein said inorganic salt is a bivalent metal salt.

3. The release agent of claim 1, wherein said inorganic salt is selected from the group consisting of $MgCl_2$, $MgBr_2$, $CaCl_2$, and $CaBr_2$.

4. The release agent of claim 1, wherein said inorganic salt is a mixture of $MgCl_2$ and $CaCl_2$.

5. The release agent of claim 1, wherein said corrosion inhibitor is a phosphate ester.

6. The release agent of claim 1, wherein said release agent is at least 50% by weight water.

7. The release agent of claim 1, wherein said inorganic salt is KCl or NaCl.

8. The release agent of claim 1, wherein said surfactant is an anionic isopropyl alcohol.

9. The asphalt release agent of claim 1, wherein said inorganic salt is a bivalent metal salt, and wherein said corrosion inhibitor is a passive inhibitor.

* * * * *